(12) United States Patent
Harpur et al.

(10) Patent No.: US 8,959,158 B2
(45) Date of Patent: Feb. 17, 2015

(54) LEVERAGING POINT-IN-TIME KNOWLEDGE TO RESPOND TO E-MAIL

(75) Inventors: Liam Harpur, Dublin (IE); Patrick J. O'Sullivan, Dublin (IE); Fred Raguillat, Meath (IE); Edith H. Stern, Yorktown Heights, NY (US); Barry E. Willner, Briarcliff Manor, NY (US)

(73) Assignee: International Business Machines Corporation, Armonk, NY (US)

( * ) Notice: Subject to any disclaimer, the term of this patent is extended or adjusted under 35 U.S.C. 154(b) by 1379 days.

(21) Appl. No.: 12/577,408

(22) Filed: Oct. 12, 2009

(65) Prior Publication Data

US 2011/0087740 A1 Apr. 14, 2011

(51) Int. Cl.
*G06F 15/16* (2006.01)
*G06Q 10/10* (2012.01)

(52) U.S. Cl.
CPC .................................. *G06Q 10/107* (2013.01)
USPC .......................................... 709/206; 709/204

(58) Field of Classification Search
USPC ................................................ 709/206, 204
See application file for complete search history.

(56) References Cited

U.S. PATENT DOCUMENTS

| | | | |
|---|---|---|---|
| 4,851,829 A | 7/1989 | DeLuca et al. | |
| 4,884,506 A | 12/1989 | Guerreri | |
| 4,964,155 A | 10/1990 | Pinard | |
| 5,093,918 A | 3/1992 | Heyen et al. | |
| 5,225,826 A | 7/1993 | DeLuca et al. | |
| 5,262,944 A | 11/1993 | Weisner et al. | |
| 5,309,563 A | 5/1994 | Farrand et al. | |
| 5,381,477 A | 1/1995 | Beyers, II et al. | |
| 5,420,923 A | 5/1995 | Beyers, II et al. | |
| 5,724,525 A | 3/1998 | Beyers, II et al. | |
| 5,790,639 A | 8/1998 | Ranalli et al. | |
| 5,883,952 A | 3/1999 | Fritsche | |
| 5,923,848 A | 7/1999 | Goodhand et al. | |
| 5,974,541 A * | 10/1999 | Hall et al. | 712/228 |
| 6,047,264 A | 4/2000 | Fisher et al. | |
| 6,212,553 B1 | 4/2001 | Lee et al. | |
| 6,311,274 B1 | 10/2001 | Day | |
| 6,314,454 B1 * | 11/2001 | Wang et al. | 709/206 |
| 6,356,917 B1 | 3/2002 | Dempsey et al. | |
| 6,450,411 B1 | 9/2002 | Rash et al. | |
| 6,513,060 B1 | 1/2003 | Nixon et al. | |
| 6,549,950 B2 | 4/2003 | Lytle et al. | |
| 6,567,937 B1 | 5/2003 | Flores et al. | |
| 6,587,126 B1 | 7/2003 | Wakai et al. | |
| 6,587,861 B2 | 7/2003 | Wakai et al. | |
| 6,618,716 B1 | 9/2003 | Horvitz | |
| 6,633,871 B1 | 10/2003 | Jeyachandran et al. | |
| 6,691,162 B1 | 2/2004 | Wick | |
| 6,708,205 B2 | 3/2004 | Sheldon et al. | |
| 6,822,945 B2 | 11/2004 | Petrovykh | |
| 6,891,934 B1 | 5/2005 | Gao et al. | |
| 6,973,620 B2 | 12/2005 | Gusler et al. | |
| 7,003,087 B2 | 2/2006 | Spencer et al. | |
| 7,123,695 B2 | 10/2006 | Malik | |
| 7,126,717 B2 | 10/2006 | Jeyachandran et al. | |

(Continued)

*Primary Examiner* — Dustin Nguyen
*Assistant Examiner* — Joel Mesa
(74) *Attorney, Agent, or Firm* — Law Office of Jim Boice (57) ABSTRACT

Point-in-time actions are leveraged between computers that receive the same asynchronous electronic message. A point-in-time action is performed at a first receiving computer in response to receipt of an asynchronous electronic message. The point-in-time action results in an action alert, which is transmitted to a second receiving computer that also received the asynchronous electronic message.

20 Claims, 4 Drawing Sheets

(56) References Cited

U.S. PATENT DOCUMENTS

| | | |
|---|---|---|
| 7,162,513 B1 | 1/2007 | Kister et al. |
| 7,260,205 B1 | 8/2007 | Murphy et al. |
| 2003/0187766 A1 | 10/2003 | Akashi |
| 2004/0266397 A1* | 12/2004 | Smith et al. ............... 455/412.1 |
| 2005/0160145 A1* | 7/2005 | Gruen et al. ................. 709/206 |
| 2006/0184634 A1* | 8/2006 | Owen et al. .................. 709/206 |
| 2009/0167553 A1* | 7/2009 | Hong et al. ............. 340/825.29 |
| 2009/0177754 A1* | 7/2009 | Brezina et al. ............... 709/206 |

\* cited by examiner

LEVERAGING POINT-IN-TIME KNOWLEDGE TO RESPOND TO E-MAIL

BACKGROUND

The present disclosure relates to the field of computers, and specifically to messages between computers. Still more particularly, the present disclosure relates to asynchronous electronic messages between users of computers.

BRIEF SUMMARY

The present disclosure presents a computer-implemented method, computer system, and computer program product for leveraging point-in-time actions. An action alert is generated at a first receiving computer in response to a point-in-time action being performed at the first receiving computer. The point-in-time action, which is transmitted to a second receiving computer, is performed in response to the first receiving computer receiving an asynchronous electronic message that is also received by the second receiving computer.

DETAILED DESCRIPTION

As will be appreciated by one skilled in the art, the present disclosure may be embodied as a system, method or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product embodied in one or more computer-readable medium(s) having computer-readable program code embodied thereon.

Any combination of one or more computer-readable medium(s) may be utilized. The computer-readable medium may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

In the context of this document, a computer-readable storage medium may be any tangible medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Figure 1:
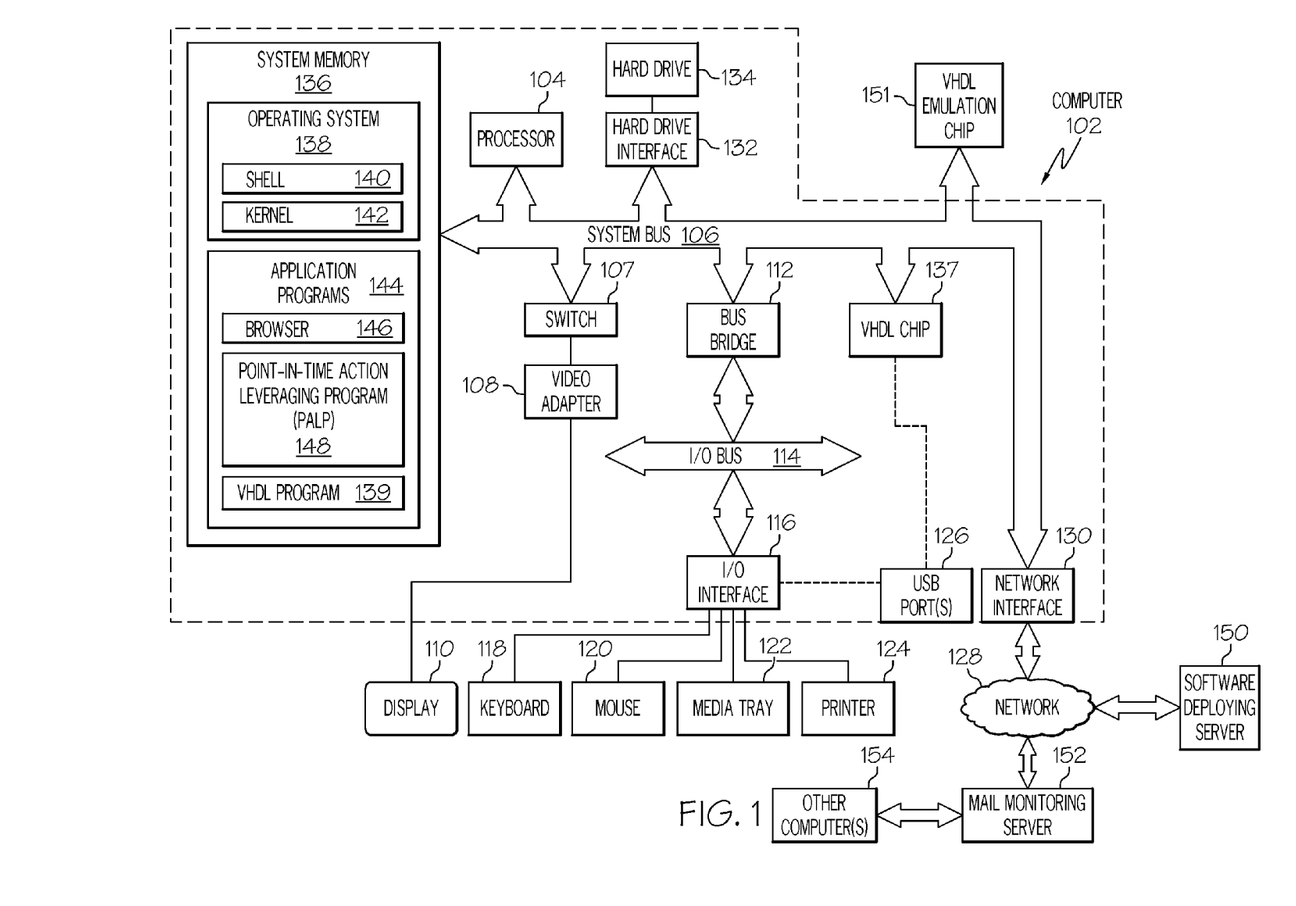
FIG. 1 depicts an exemplary computer in which the present disclosure may be implemented.

With reference now to the figures, and in particular to FIG. 1, there is depicted a block diagram of an exemplary computer 102, which may be utilized by the present disclosure. Note that some or all of the exemplary architecture, including both depicted hardware and software, shown for and within computer 102 may be utilized by software deploying server 150, mail monitoring server 152, and/or other computer(s) 154. Similarly, the architecture depicted for computer 102 may be utilized by sending computer 202, mail monitoring server 206, receiving computers 208a-n, and/or downstream computers 210a-b shown below in FIG. 2.

Computer 102 includes a processor unit 104 that is coupled to a system bus 106. Processor unit 104 may utilize one or more processors, each of which has one or more processor cores. A video adapter 108, which drives/supports a display 110, is also coupled to system bus 106. In one embodiment, a switch 107 couples the video adapter 108 to the system bus 106. Alternatively, the switch 107 may couple the video adapter 108 to the display 110. In either embodiment, the switch 107 is a switch, preferably mechanical, that allows the display 110 to be coupled to the system bus 106, and thus to be functional only upon execution of instructions (e.g., point-in-time action leveraging program—PALP 148 described below) that support the processes described herein.

System bus 106 is coupled via a bus bridge 112 to an input/output (I/O) bus 114. An I/O interface 116 is coupled to I/O bus 114. I/O interface 116 affords communication with various I/O devices, including a keyboard 118, a mouse 120, a media tray 122 (which may include storage devices such as CD-ROM drives, multi-media interfaces, etc.), a printer 124, and (if a VHDL chip 137 is not utilized in a manner described below), external USB port(s) 126. While the format of the ports connected to I/O interface 116 may be any known to those skilled in the art of computer architecture, in a preferred embodiment some or all of these ports are universal serial bus (USB) ports.

As depicted, computer 102 is able to communicate with a software deploying server 150, mail monitoring server 152, and/or other computer(s) 154 via network 128 using a network interface 130. Network 128 may be an external network such as the Internet, or an internal network such as an Ethernet or a virtual private network (VPN).

A hard drive interface 132 is also coupled to system bus 106. Hard drive interface 132 interfaces with a hard drive 134. In a preferred embodiment, hard drive 134 populates a system memory 136, which is also coupled to system bus 106. System memory is defined as a lowest level of volatile memory in computer 102. This volatile memory includes additional higher levels of volatile memory (not shown), including, but not limited to, cache memory, registers and buffers. Data that populates system memory 136 includes computer 102's operating system (OS) 138 and application programs 144.

OS 138 includes a shell 140, for providing transparent user access to resources such as application programs 144. Generally, shell 140 is a program that provides an interpreter and an interface between the user and the operating system. More specifically, shell 140 executes commands that are entered into a command line user interface or from a file. Thus, shell 140, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. Note that while shell 140 is a text-based, line-oriented user interface, the present disclosure will equally well support other user interface modes, such as graphical, voice, gestural, etc.

As depicted, OS 138 also includes kernel 142, which includes lower levels of functionality for OS 138, including providing essential services required by other parts of OS 138 and application programs 144, including memory management, process and task management, disk management, and mouse and keyboard management.

Application programs 144 include a renderer, shown in exemplary manner as a browser 146. Browser 146 includes program modules and instructions enabling a world wide web (WWW) client (i.e., computer 102) to send and receive network messages to the Internet using hypertext transfer protocol (HTTP) messaging, thus enabling communication with software deploying server 150 and other described computer systems.

Application programs 144 in computer 102's system memory (as well as software deploying server 150's system memory) also include a point-in-time action leveraging program (PALP) 148. PALP 148 includes code for implementing the processes described below, including those described in FIGS. 2-4. In one embodiment, computer 102 is able to download PALP 148 from software deploying server 150, including in an on-demand basis, such that the code from PALP 148 is not downloaded until runtime or otherwise immediately needed by computer 102. Note further that, in one embodiment of the present disclosure, software deploying server 150 performs all of the functions associated with the present disclosure (including execution of PALP 148), thus freeing computer 102 from having to use its own internal computing resources to execute PALP 148.

Also stored in system memory 136 is a VHDL (VHSIC hardware description language) program 139. VHDL is an exemplary design-entry language for field programmable gate arrays (FPGAs), application specific integrated circuits (ASICs), and other similar electronic devices. In one embodiment, execution of instructions from PALP 148 causes VHDL program 139 to configure VHDL chip 137, which may be an FPGA, ASIC, etc.

In another embodiment of the present disclosure, execution of instructions from PALP 148 results in a utilization of VHDL program 139 to program a VHDL emulation chip 151. VHDL emulation chip 151 may incorporate a similar architecture as described above for VHDL chip 137. Once PALP 148 and VHDL program 139 program VHDL emulation chip 151, VHDL emulation chip 151 performs, as hardware, some or all functions described by one or more executions of some or all of the instructions found in PALP 148. That is, the VHDL emulation chip 151 is a hardware emulation of some or all of the software instructions found in PALP 148. In one embodiment, VHDL emulation chip 151 is a programmable read only memory (PROM) that, once burned in accordance with instructions from PALP 148 and VHDL program 139, is permanently transformed into a new circuitry that performs the functions needed to perform the process described below in FIGS. 2-4.

The hardware elements depicted in computer 102 are not intended to be exhaustive, but rather are representative to highlight essential components required by the present disclosure. For instance, computer 102 may include alternate memory storage devices such as magnetic cassettes, digital versatile disks (DVDs), Bernoulli cartridges, and the like. These and other variations are intended to be within the spirit and scope of the present disclosure.

Note that in one embodiment, components depicted in computer 102 can be utilized in a computer system for leveraging point-in-time actions, wherein the point-in-time actions are performed in response to a receipt of an asynchronous electronic message. In an exemplary embodiment of such a computer system, network interface 130 and processor 104 can be utilized, when executing code from PALP 148, as receiving logic for receiving an asynchronous electronic message at a first receiving computer, wherein the asynchronous electronic message is also sent to a second receiving computer. Furthermore, processor 104 and PALP 148 can be utilized as detection logic for detecting a point-in-time action taken by the second user, wherein the point-in-time action is performed by the second user in response to the second user receiving the message. Network interface 130 and processor 104 can be also utilized, when executing code from PALP 148, as receiving logic for receiving an action alert from the second user, wherein the action alert indicates that the point-in-time action has been taken by the second user. Furthermore, processor 104 can execute code from PALP 148 to perform as modification logic for, in response to receiving the action alert from the second user, modifying a response to the asynchronous electronic message at the first receiving computer.

Figure 2:
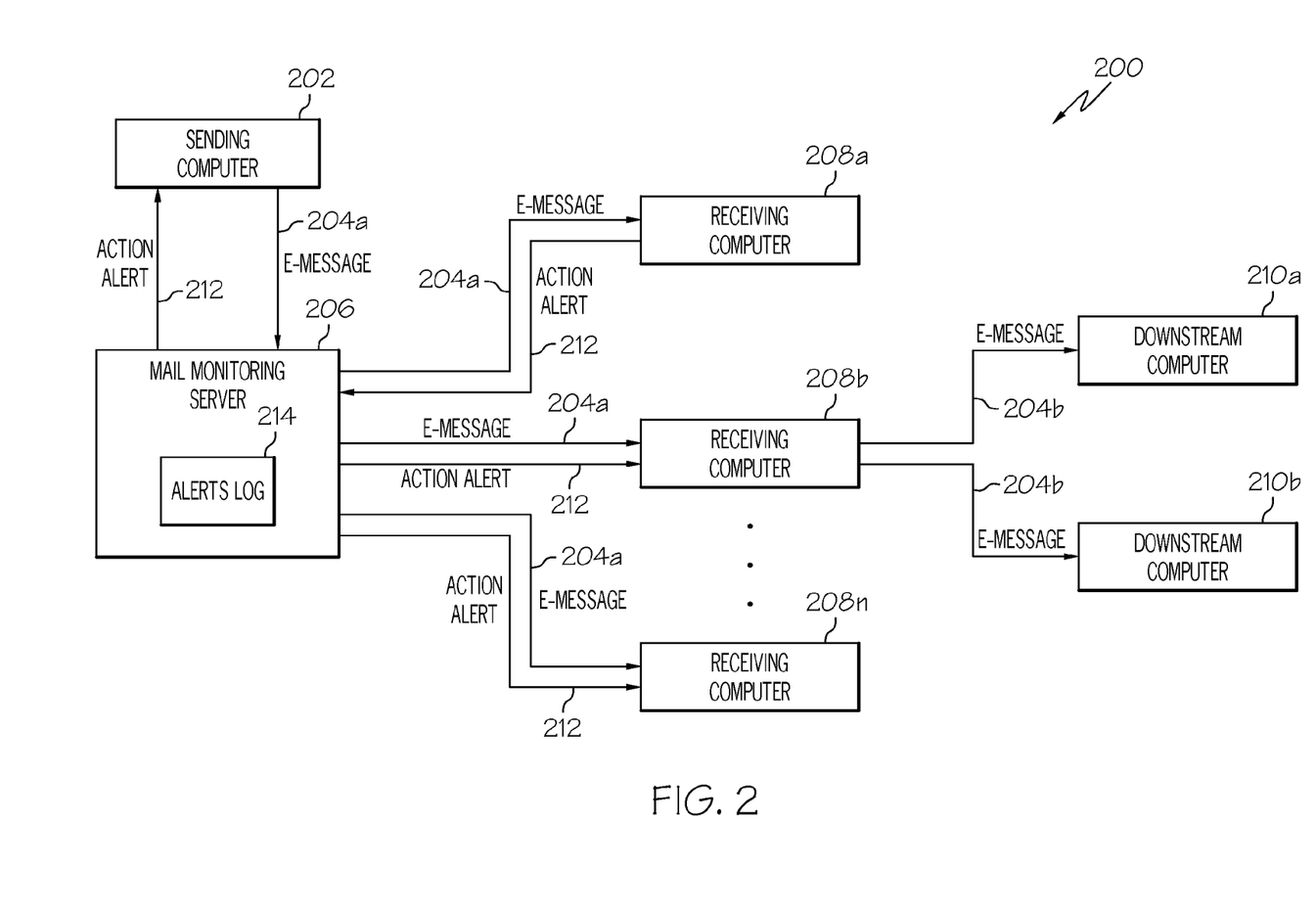
FIG. 2 illustrates an exemplary network in which actions, responsive to asynchronous electronic messages, are leveraged.

With reference now to FIG. 2, depicted is an exemplary network 200 in which actions, responsive to e-messages, can be leveraged. Assume that a sending computer 202 (analogous to computer 102 shown in FIG. 1) sends an e-message 204a. An exemplary e-message 204a may be a request, from a manager who is using the sending computer 202, asking for a report, information or other work related to a specific topic (e.g., a particular work project). This e-message 204a is broadcast to multiple receiving computers 208a-n (analogous to other computer(s) 154 shown in FIG. 1), which may be used by subordinate workers or co-workers of the manager. Without the present disclosure, there is a high likelihood that efforts will be duplicated by the subordinate workers/co-workers responding to the e-message 204a. That is, a user of receiving computer 208a may be preparing a responsive e-mail that is substantively the same as that prepared by a user of receiving computer 208b, since both users would be unaware of the work being done by the other, thus resulting in an expensive waste of time.

Once a receiving computer 208 (i.e., one of the receiving computers 208a-n) performs some type of action (described in exemplary detail below) in response to receiving the e-message 204a, an action alert 212 is generated by the receiving computer 208 and transmitted to other receiving computers 208a-n and/or sending computer 202 via mail monitoring server 206. For example, assume that receiving computer 208a performs an action in response to receiving the e-message 204a from the sending computer 202. This action results in receiving computer 208a sending an action alert 212 to the other co-recipients (receiving computers 208b-n) of the e-message 204a, which is received and monitored by mail monitoring server 206, which in one embodiment directs and controls the actions described herein. This action alert lets a co-recipient know that another co-recipient is somehow responding to the e-message 204a, and thus should take steps to ensure that efforts to respond to the e-message 204a are not unnecessarily taken.

An alerts log 214, within a mail monitoring server 206 (analogous to mail monitoring server 152 shown in FIG. 1), is used to keep track of the actions alerts 212, including descriptors (e.g., metatags, keywords, etc.) of the action that prompted the alerts, identification of which sending computer and/or receiving computer is involved, etc.

It is understood that the e-messages 204a-b depicted in FIG. 2 may be any type of asynchronous electronic messages. In one embodiment described herein, these asynchronous electronic messages are user-generated asynchronous electronic messages, such as e-mail. In one embodiment, original e-message 204a is initially sent to a mail monitoring server 206, which then forwards the e-message 204a to multiple receiving computers 208a-n (where "n" is an integer). One or more of the receiving computers 208a-n can then forward the original e-message 204a to one or more downstream computers 210a-b (wherein "b" is an integer) as e-message 204b. The text, subject line, etc. of e-message 204b may be the same as or a modified version of e-message 204a.

In one embodiment of the present disclosure, the mail monitoring server 206 performs some or all essential steps, including receiving and relaying e-messages, monitoring for and relaying action alerts, etc., in order to control the processes described herein. In another embodiment, some or all of these steps are performed by one of the receiving computers 208a-n, such that the mail monitoring server 206 acts as a conduit for communications among the receiving computers 208a-n.

Figure 3:
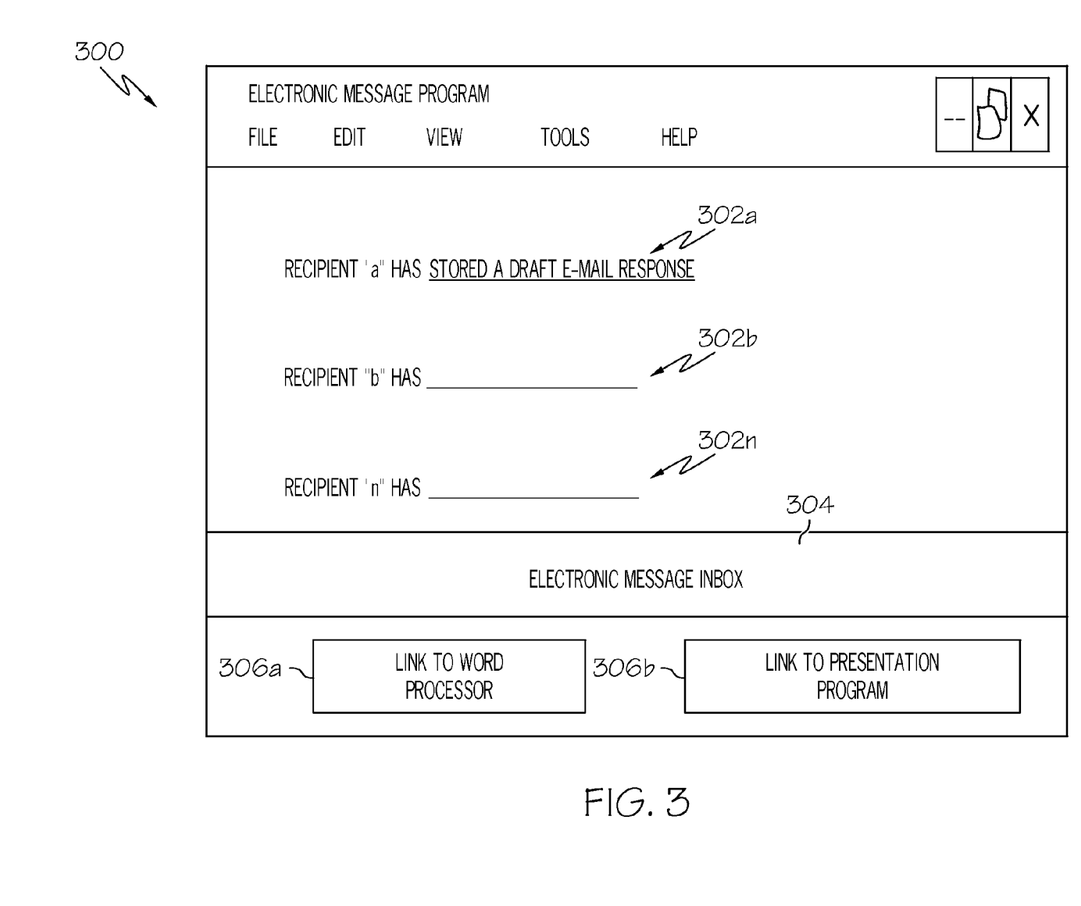
FIG. 3 depicts an exemplary GUI that is displayed to describe responsive actions taken by a recipient of the asynchronous electronic message.

With reference now to FIG. 3, an exemplary graphical user interface (GUI) 300, showing what actions have been performed by recipient computers of the e-message is presented. These actions are described in action alerts, which populate active fields 302a-n as depicted. For example, recipient "a" (analogous to receiving computer 208a shown in FIG. 2) has stored a draft response to the e-message 204a. In one embodiment, GUI 300 is presented to all other co-recipient computers (e.g., other receiving computers 208a-n shown in FIG. 2) of the e-message that prompted a first co-recipient computer to perform some type of action (which resulted in the action alert 212). In one embodiment, GUI 300 is presented to the sending computer (e.g., sending computer 202 shown in FIG. 2) that sent the original e-message 204a.

Figure 4:
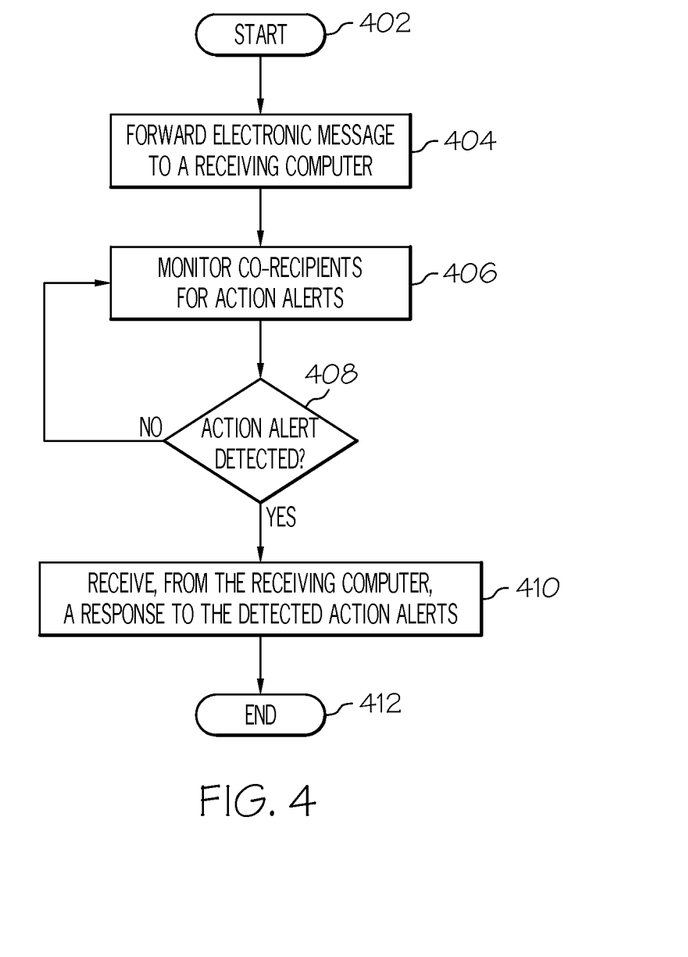
FIG. 4 is a high-level flow-chart of exemplary acts performed by a computer to leverage responsive actions taken by recipients of the asynchronous electronic message.

Referring now to FIG. 4, a high-level flow-chart of exemplary acts performed by a computer to leverage responsive actions taken by recipients of an e-message is presented. After initiator block 402, the mail monitoring server transmits/forwards an asynchronous electronic message to a first co-recipient receiving computer (block 404). This asynchronous electronic message (e.g., an e-mail) is related to a specific topic, such as a request for information on a particular project, a request for a report or other work on that project, etc. As depicted in block 406, the mail monitoring server then monitors other co-recipient computers (e.g., one or more second receiving computers) for any action alerts. These action alerts are generated in response to an action taken at a co-recipient computer in response to a user of that co-recipient computer receiving the asynchronous electronic message. Examples of such actions taken include, but are not limited to, the following actions:

Opening a database that is related to the specific topic of the asynchronous electronic message. For example, assume that the asynchronous electronic message is related to Project ABC, as indicated by a subject line in the asynchronous electronic message or by key words found within the body of the asynchronous electronic message. If a user of the co-recipient computer opens a database for Project ABC, this is a good indicator that he is working on a response to the original asynchronous electronic message, and thus an action alert is generated.

Performing an Internet search for topics related to the specific topic of the asynchronous electronic message. For example, assume again that the asynchronous electronic message is related to Project ABC. If the user of the co-recipient computer searches the Internet for keywords known (e.g., stored within a lookup table for Project ABC) to be related to Project ABC, then this likewise is a good indicator that he is working on a response to the original asynchronous electronic message, and thus an action alert is generated.

Opening an existing local folder that is related to the specific topic of the asynchronous electronic message. Again, assume that the asynchronous electronic message is related to Project ABC. If Project ABC has a folder reserved for it, then if a user of the co-recipient computer opens this folder, that is a good indicator that he is working on a response to the original asynchronous electronic message, and thus an action alert is generated. Identifying which folder is reserved for Project ABC may be as simple as comparing folder names to the subject line of the electronic mail, or contents of the folder can be scanned for terms that are common to the name, subject line, or body of the asynchronous electronic message.

Creating a new document that is related to the specific topic of the asynchronous electronic message. This specific topic can be identified in a manner described above. However, in this embodiment, it is the creation of a new document (a text document, a media presentation document, etc.) that is intelligently determined by the co-recipient computer to be related to the specific topic of the asynchronous electronic message. Creating such a document is a good indicator that the user of the co-recipient computer is working on a response to the original asynchronous electronic message, and thus an action alert is generated. In one embodiment, the creation of a new document is presumed, and thus detected, when the recipient of the original asynchronous electronic message opens a document creation program, such as a word processing program. For example, consider the GUI 300 shown in FIG. 3. GUI 300 is able to display incoming asynchronous electronic messages in an asynchronous electronic message inbox 304. After the user opens one of the messages in the asynchronous electronic message inbox 304, she can click one of the links 306a-b to open a document creation program (e.g., a word processor—306a or a graphics-based presentation program—306b). Clicking such a link while a particular asynchronous electronic message is still open or has recently been opened (even if now closed) is a clear indicator that the user is working on a response to the original asynchronous electronic message.

Adding an entry to a "to do" list. If the user of the co-recipient computer adds a task to her "to do" list on her computer, logic (e.g., part of PALP 148 shown in FIG. 1) can perform a term search/comparison, examine a lookup table, etc. to determine that the new task added to the "to do" list is related to the received original asynchronous electronic message. If such a match occurs, this is a good indicator that the user of the co-recipient computer is working on a response to the original asynchronous electronic message, and thus an action alert is generated.

Creating a new asynchronous electronic message. If the user of the co-recipient computer creates a new asynchronous electronic message that is related to the original asynchronous electronic message, and then sends it to one or more of the co-recipient computers (other receiving computers 208a-n shown in FIG. 2) or one or more downstream computers (210a-b shown in FIG. 2), this is a good indicator that the user of the co-recipient computer is working on a response to the original asynchronous electronic message, and thus an action alert is generated.

Retrieving related and previously received asynchronous electronic messages. If the user of the co-recipient computer retrieves and/or re-opens previously received asynchronous electronic messages that are related to the topic of the currently received asynchronous electronic message, this is a good indicator that the user of the co-recipient computer is working on a response to the original asynchronous electronic message, and thus an action alert is generated.

Entering time into a billing calendar. Assume that the user of the co-recipient computer must keep track of his billable time. If that user opens a billing window and enters time for the topic of the asynchronous electronic message, this is a good indicator that the user of the co-recipient computer is working on a response to the original asynchronous electronic message, and thus an action alert is generated.

Saving a draft of a response e-mail. Assume that the user of the co-recipient computer creates a response to the original asynchronous electronic message, but wants to review/edit that response before sending it back to the sending computer. That user will store a draft of a responsive asynchronous electronic message. This act of storing can be detected (e.g., by logic within PALP 148), thus providing a good indicator that the user of the co-recipient computer is working on a response to the original asynchronous electronic message, and thus an action alert is generated.

Printing the asynchronous electronic message. Assume that the user of the co-recipient computer prints a copy of the original asynchronous electronic message from the sending computer. This action is a good indicator that the user of the co-recipient computer is working on a response to the original asynchronous electronic message, and thus an action alert is generated.

Copying a portion of the asynchronous electronic message. Assume that the user of the co-recipient computer copies (e.g., "cuts and pastes") some or all of the original asynchronous electronic message from the sending computer. This action is a good indicator that the user of the co-recipient computer is working on a response to the original asynchronous electronic message, and thus an action alert is generated.

Returning now to block 406, note that in one embodiment, groups or hierarchies are established to define which co-recipient computers are authorized to be monitored for and/or notified of action activities. For example, receiving computer 208a may be authorized to receive action alerts 212 that are generated by receiving computer 208b, but may not be authorized to receive action alerts 212 that are generated by receiving computer 208n. Similarly, receiving computer 208n may not be authorized to receive any action alerts at all.

If an action alert is detected (query block 408), then a response can be created by the receiving computer (or alternatively, by the mail monitoring server itself). If the response is created/initiated by the receiving computer, then this response is sent to the mail monitoring server (block 410). Examples of such a response include, but are not limited to, automatically deleting the asynchronous electronic message from the first receiving computer (e.g., the co-recipient computer that received the asynchronous electronic message and did not perform the responsive action, but rather received the action alert from another co-recipient computer); displaying the action alert to the first receiving computer (as shown in FIG. 3); instructing a user of the first receiving computer to contact (by e-mail, phone call, etc.) a user of the co-recipient computer that generated the action alert; etc. The process ends at terminator block 412.

Note that in one embodiment, all steps taken in FIG. 4 are performed by a co-recipient computer of the asynchronous electronic message. That is, the co-recipient computers are the units that are kept apprised of the actions being performed by other co-recipient computers. In another embodiment, the sending computer of the original asynchronous electronic message is the entity that is kept apprised of such actions by the co-recipient computers. In another embodiment, both the sending computer and the co-recipient computers are kept apprised of such actions. In another embodiment, all monitoring of actions and alert management is performed by the mail monitoring server.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

Note further that any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA.

Having thus described embodiments of the disclosure of the present application in detail and by reference to illustrative embodiments thereof, it will be apparent that modifications and variations are possible without departing from the scope of the disclosure defined in the appended claims.

What is claimed is:

1. A computer-implemented method of leveraging point-in-time actions, the computer-implemented method comprising: establishing a hierarchical group that comprises a first receiving computer and a second receiving computer, wherein the hierarchical group defines which co-recipient computers are authorized to be monitored for and notified of action activities; receiving, by the first receiving computer, an asynchronous electronic message; performing, at the first receiving computer and in response to receiving the asynchronous electronic message, a point-in-time action, wherein the point-in-time action comprises performing an Internet word search for subjects that are related to a topic of the asynchronous electronic message; generating an action alert by the first receiving computer, wherein the action alert is generated in response to the point-in-time action being performed at the first receiving computer, wherein the asynchronous electronic message is an open request to any of multiple recipients to perform an activity related to a particular project, wherein the point-in-time action initiated a performance of the activity related to the particular project, wherein the action alert indicates that the point-in-time action has been taken by the user of the first receiving computer, and wherein transmission of the action alert is limited to other computers in the hierarchical group; transmitting the action alert to the second receiving computer, wherein the second receiving computer also receives the asynchronous electronic message, and wherein the action alert is automatically generated and transmitted by the first receiving computer in response to the user of the first receiving computer performing the point-in-time action; and receiving a response from the second receiving computer, wherein the response is generated by the second receiving computer in response to the second receiving computer receiving the action alert, and wherein the response instructs a user of the first receiving computer to contact by telephone a user of the second receiving computer.

2. The computer-implemented method of claim 1, wherein the action alert comprises instructions to force the second receiving computer to automatically delete the asynchronous electronic message from the second receiving computer.

3. The computer-implemented method of claim 1, wherein the action alert comprises instructions to force details of the point-in-time action to be displayed on the second receiving computer.

4. The computer-implemented method of claim 1, wherein the point-in-time action taken at the first receiving computer further comprises opening a database that is related to a topic of the asynchronous electronic message.

5. The computer-implemented method of claim 1, wherein the point-in-time action taken at the first receiving computer further comprises retrieving previously received asynchronous electronic messages that are related to the topic of the currently received asynchronous electronic message.

6. The computer-implemented method of claim 1, wherein the point-in-time action taken at the first receiving computer further comprises opening an existing local folder that is related to a topic of the asynchronous electronic message.

7. The computer-implemented method of claim 6, wherein the asynchronous electronic message is an e-mail that has a topic described in a subject line, wherein a descriptor term in the subject line describes the topic of the e-mail, wherein a name of the existing local folder comprises the descriptor term, and wherein the existing local folder is identified as being related to the topic of the asynchronous electronic e-mail if the name of the local folder comprises the descriptor term.

8. The computer-implemented method of claim 1, wherein the point-in-time action taken at the first receiving computer further comprises creating a new document that is related to a topic of the asynchronous electronic message.

9. The computer-implemented method of claim 8, wherein the asynchronous electronic message is an e-mail that has a topic identified in a subject line, wherein a descriptor term in the subject line describes the topic of the e-mail, wherein a name of the new document comprises the descriptor term, and wherein the new document is identified as being related to the topic of the e-mail if the name of the new document comprises the descriptor term.

10. The computer-implemented method of claim 1, wherein the point-in-time action taken at the first receiving computer further comprises adding an entry to an existing "to do" list on the first receiving computer, wherein the entry on the existing "to do" list is logically related to a topic of the asynchronous electronic message.

11. The computer-implemented method of claim 1, wherein the asynchronous electronic message is an original e-mail that has a subject line, and wherein the point-in-time action taken at the first receiving computer further comprises creating a new e-mail that shares a common term with the subject line from the original e-mail.

12. The computer-implemented method of claim 1, wherein the asynchronous electronic message is an original e-mail that has a subject line, wherein the point-in-time action taken by the first user further comprises retrieving a prior e-mail that shares a common term with the subject line from the original e-mail, and wherein the prior e-mail was previously received by the first user.

13. The computer-implemented method of claim 1, wherein the point-in-time action taken at the first receiving computer further comprises creating a time entry in a billing calendar, and wherein the time entry is related to a topic of the asynchronous electronic message.

14. The computer-implemented method of claim 1, wherein the asynchronous electronic message is an original e-mail, and wherein the point-in-time action taken at the first receiving computer further comprises saving a draft of a response e-mail to the original e-mail.

15. The computer-implemented method of claim 1, wherein the point-in-time action taken at the first receiving computer further comprises printing the asynchronous electronic message.

16. The computer-implemented method of claim 1, wherein the asynchronous electronic message is an original e-mail, and wherein the point-in-time action taken at the first receiving computer further comprises copying a portion of the original e-mail.

17. A computer system comprising: a central processing unit; and a computer readable memory coupled to the central processing unit, wherein the computer readable memory comprises software which, when executed, causes the central processing unit to implement: establishing a hierarchical group, wherein the hierarchical group defines which co-recipient computers are authorized to be monitored for and notified of action activities; receiving an asynchronous electronic message; performing, in response to receiving the asynchronous electronic message, a point-in-time action, wherein the point-in-time action comprises performing an Internet word search for subjects that are related to a topic of the asynchronous electronic message; generating an action alert, wherein the action alert is generated in response to the point-in-time action being performed at the computer system, wherein the asynchronous electronic message is an open request to any of multiple recipients to perform an activity related to a particular project, wherein the point-in-time action initiated a performance of the activity related to the particular project, wherein the action alert indicates that the point-in-time action has been taken by the user of said computer system, and wherein transmission of the action alert is limited to other computers in the hierarchical group; transmitting the action alert to another computer that also receives the asynchronous electronic message, wherein the action alert is automatically generated and transmitted by said computer system in response to the user of said computer system performing the point-in-time action; and receiving a response from said another computer, wherein the response is generated by said another computer in response to said another computer receiving the action alert, and wherein the response instructs a user of the computer system to contact by telephone a user of said another computer, wherein the action alert comprises instructions to force said another computer to automatically delete the asynchronous electronic message from said another computer, wherein the point-in-time action taken at said computer system further comprises opening a database that is related to a topic of the asynchronous electronic message, wherein the point-in-time action taken at said computer system further comprises retrieving previously received asynchronous electronic messages that are related to the topic of the currently received asynchronous electronic message, wherein the point-in-time action taken at said computer system further comprises opening an existing local folder that is related to a topic of the asynchronous electronic message, wherein the asynchronous electronic message is an e-mail that has a topic described in a subject line, wherein a descriptor term in the subject line describes the topic of the e-mail, wherein a name of the existing local folder comprises the descriptor term, wherein the existing local folder is identified as being related to the topic of the asynchronous electronic e-mail if the name of the local folder comprises the descriptor term, wherein the point-in-time action taken at said computer system further comprises creating a new document that is related to a topic of the asynchronous electronic message, wherein the point-in-time action taken at said computer system further comprises creating a time entry in a billing calendar, and wherein the time entry is related to a topic of the asynchronous electronic message.

18. The computer system of claim 17, wherein modifying the response comprises transmitting a message to a sending computer that the computer system is in a process of creating a reply e-mail to the asynchronous electronic message.

19. A computer program product comprising a non-transitory computer readable storage medium embodied therewith, the non-transitory computer readable storage medium comprising: computer readable program code for establishing a hierarchical group, wherein the hierarchical group defines which co-recipient computers are authorized to be monitored for and notified of action activities; computer readable program code for receiving an asynchronous electronic message at a computer system; computer readable program code for performing, in response to the computer system receiving the asynchronous electronic message, a point-in-time action, wherein the point-in-time action comprises performing an Internet word search for subjects that are related to a topic of the asynchronous electronic message; computer readable program code configured for generating an action alert, wherein the action alert is generated in response to the point-in-time action being performed at by the computer system, wherein the asynchronous electronic message is an open request to any of multiple recipients to perform an activity related to a particular project, wherein the point-in-time action initiated a performance of the activity related to the particular project, wherein the action alert indicates that the point-in-time action has been taken by the user of said computer system, and wherein transmission of the action alert is limited computers in the hierarchical group; computer readable program code for transmitting the action alert to another computer that also receives the asynchronous electronic message, wherein the action alert is automatically generated and transmitted by said computer system in response to the user of said computer system performing the point-in-time action; and computer readable program code for receiving a response from said another computer, wherein the response is generated by said another computer in response to said another computer receiving the action alert, and wherein the response instructs a user of the computer system to contact by telephone a user of said another computer, wherein the action alert comprises instructions to force said another computer to automatically delete the asynchronous electronic message from said another computer, wherein the point-in-time action taken at said computer system further comprises opening a database that is related to a topic of the asynchronous electronic message, wherein the point-in-time action taken at said computer system further comprises retrieving previously received asynchronous electronic messages that are related to the topic of the currently received asynchronous electronic message, wherein the point-in-time action taken at said computer system further comprises opening an existing local folder that is related to a topic of the asynchronous electronic message, wherein the asynchronous electronic message is an e-mail that has a topic described in a subject line, wherein a descriptor term in the subject line describes the topic of the e-mail, wherein a name of the existing local folder comprises the descriptor term, wherein the existing local folder is identified as being related to the topic of the asynchronous electronic e-mail if the name of the local folder comprises the descriptor term, wherein the point-in-time action taken at said computer system further comprises creating a new document that is related to a topic of the asynchronous electronic message, wherein the point-in-time action taken at said computer system further comprises creating a time entry in a billing calendar, and wherein the time entry is related to a topic of the asynchronous electronic message.

20. The computer program product of claim 19, wherein the action alert forces details of the action alert to be displayed on said another computer.

* * * * *